United States Patent
Zane et al.

(10) Patent No.: US 8,924,357 B2
(45) Date of Patent: Dec. 30, 2014

(54) STORAGE PERFORMANCE OPTIMIZATION

(75) Inventors: Barry M. Zane, La Jolla, CA (US); David E. Steinhoff, Ann Arbor, MI (US)

(73) Assignee: Paraccel LLC, Campbell, CA (US)

( * ) Notice: Subject to any disclaimer, the term of this patent is extended or adjusted under 35 U.S.C. 154(b) by 0 days.

(21) Appl. No.: 13/544,879

(22) Filed: Jul. 9, 2012

(65) Prior Publication Data

US 2012/0278285 A1    Nov. 1, 2012

Related U.S. Application Data

(62) Division of application No. 12/986,969, filed on Jan. 7, 2011, now abandoned, and a division of application No. 12/122,579, filed on May 16, 2008, now Pat. No. 8,682,853.

(51) Int. Cl.
*G06F 17/00* (2006.01)
*G06F 17/30* (2006.01)

(52) U.S. Cl.
CPC .... *G06F 17/30445* (2013.01); *G06F 17/30545* (2013.01)
USPC ............................. 707/649; 707/655; 707/656

(58) Field of Classification Search
USPC ......................................... 707/649, 655, 656
See application file for complete search history.

(56) References Cited

U.S. PATENT DOCUMENTS

| | | | |
|---|---|---|---|
| 6,453,316 B1 | 9/2002 | Karibe et al. | |
| 6,643,640 B1 * | 11/2003 | Getchius et al. | 707/719 |
| 7,197,519 B2 | 3/2007 | Nishikawa et al. | |
| 2002/0049759 A1 | 4/2002 | Christensen | |
| 2003/0195940 A1 | 10/2003 | Basu et al. | |
| 2004/0098371 A1 * | 5/2004 | Bayliss et al. | 707/3 |
| 2004/0111557 A1 * | 6/2004 | Nakatani et al. | 711/113 |
| 2004/0186829 A1 | 9/2004 | Suzuki et al. | |
| 2006/0080285 A1 | 4/2006 | Chowdhuri | |
| 2007/0136238 A1 | 6/2007 | Bildhaeuser et al. | |
| 2008/0034019 A1 * | 2/2008 | Cisler et al. | 707/204 |
| 2008/0034205 A1 | 2/2008 | Alain et al. | |

FOREIGN PATENT DOCUMENTS

| | | |
|---|---|---|
| JP | Hei 04-257018 A | 9/1992 |
| JP | Hei 10-111761 A | 4/1998 |
| JP | 2004-164401 A | 6/2004 |
| JP | 2007-128273 A | 5/2007 |
| JP | 2004-280528 A | 10/2007 |
| WO | WO 2008/038271 A1 | 4/2008 |

OTHER PUBLICATIONS

European Extended Search Report, European Patent Application No. 09747124.7, Mar. 20, 2012, 11 pages.
European Examination Report, European Patent Application No. 09747124.7, Nov. 22, 2012, 8 pages.

(Continued)

*Primary Examiner* — Mariela Reyes
(74) *Attorney, Agent, or Firm* — Fenwick & West LLP

(57) ABSTRACT

A system and method for enhancing data throughput in data warehousing environments by connecting multiple servers having local storages with designated external storage systems, such as, for example, those provided by SANS. The system and method may preserve a full reference copy of the data in a protected environment (e.g., on the external storage system) that is fully available. The system and method may enhance overall I/O potential performance and reliability for efficient and reliable system resource utilization.

27 Claims, 6 Drawing Sheets

(56) References Cited

OTHER PUBLICATIONS

Japanese Office Action, Japanese Patent Application No. 2011-509533, Sep. 19, 2012, 8 pages.
Japanese Office Action, Japanese Patent Application No. 2011-509533, Mar. 5, 2013, 4 pages.
Lei, M. et al., "An On-Line Replication Strategy to Increase Availability in Data Grids," Future Generations Computer Systems, Elsevier Science Publishers, Amsterdam, NL, 2008, pp. 85-98, vol. 24, No. 2.
Japanese Notice of Allowance, Japanese Application No. 2011-509533, Jun. 25, 2013, 6 pages.

* cited by examiner

`US 8,924,357 B2`

STORAGE PERFORMANCE OPTIMIZATION

RELATED APPLICATIONS

This application is a divisional of U.S. patent application Ser. No. 12/986,969, filed Jan. 7, 2011, and entitled "STORAGE PERFORMANCE OPTIMIZATION", which is a divisional of U.S. patent application Ser. No. 12/122,579, filed May 16, 2008, and entitled "STORAGE PERFORMANCE OPTIMIZATION", each of which is hereby incorporated by reference in its entirety into the present application.

FIELD OF THE INVENTION

The invention relates to management of data storage in a "database aware" distributed data environment where both local and remote storage systems are used simultaneously to fulfill IO requests.

BACKGROUND OF THE INVENTION

In traditional data warehousing and Data Mart (DM) environments, data is stored centrally on an External Storage System (ESS), such as, for example, a Storage Area Network (SAN), or locally. A single access point is typically configured in order to provide security (e.g., an ESS) or performance (e.g., access locally), but usually is not able to provide both economically. While an ESS can guarantee security, it may be prohibitively expensive to also provide performance in situations involving high data volumes or IO intensive applications. Conversely, local storage systems typically have high data throughput capabilities, but are not able to store high data volumes effectively or guarantee security without sacrificing storage capacity through excessive redundancy.

Parallel warehousing and DM environments present both opportunities and additional overhead in environments that rely on single storage configurations. Shared-nothing parallel database systems relying on local storage must develop sophisticated solutions for failover recovery (FR) and disaster recovery (DR). Such systems can double or quadruple storage requirements, hence reduce capacity on each server, which can lead to a proliferation of servers or reduced system capacity. Shared-storage parallel database systems (e.g., implementing an ESS) typically rely on centralized high-availability and security services, which reduces the FR and DR infrastructure complexity of parallel solutions, but at the cost of reduced data throughput. This may lead to inefficient use of the parallel systems, limit the expansion capabilities of the system, significantly reduce the system's ability to scale linearly to support increasing data volumes and application demands from expanded user requirements, and/or other drawbacks.

SUMMARY OF THE INVENTION

One aspect of the invention relates to systems and methods that seek to optimize (or at least enhance) data throughput in data warehousing environments by connecting multiple servers having local storages with a designated ESS, such as, for example, a SAN. According to another aspect of the invention, the systems and methods preserve a full reference copy of the data in a protected environment (e.g., on the ESS) that is fully available. According to another aspect of the invention, the systems and methods maximize (or at least significantly enhance) overall IO potential performance and reliability for efficient and reliable system resource utilization.

Other aspects and advantages of the invention include providing a reliable data environment in a mixed storage configuration, compensating and adjusting for differences in disk (transfer) speed between mixed storage components to sustain high throughput, supporting different disk sizes on server configurations, supporting high performance FR and DR in a mixed storage configuration, supporting dynamic reprovisioning as servers are added to and removed from the system configuration and supporting database clustering in which multiple servers are partitioned within the system to support separate databases, applications or user groups, and/or other enhancements. Servers within the data warehousing environment may be managed in an autonomous, or semi-autonomous, manner, thereby alleviating the need for a sophisticated central management system.

According to some embodiments, a system may include one or more of an ESS, one or more servers, local storage associated with individual ones of the servers, one or more clients, and/or other components. The ESS may hold an entire copy of the database. The local storage at individual ones of the servers may hold a portion of the database. A given server may manage the storage of data within the corresponding local storage, and may manage the retrieval of data from the ESS and/or the corresponding local storage. A given client may be operatively linked with a server, and may provide an interface between the database and one or more users and/or administrators.

The ESS may hold a copy of the entire database. This copy may be kept current in real-time, or near real-time. As such, the copy of the database held by the ESS may be used as a full reference copy for FR or DR on portions of the database stored within the local storage of individual servers. Since the copy of the ESS is kept continuously (or substantially so) current, "snapshots" of the database may be captured without temporarily isolating the ESS artificially from the servers to provide a quiescent copy of the database. By virtue of the centralized nature of the ESS, the database copy may be maintained with relatively high security and/or high availability (e.g., due to standard replication and striping policies). In some implementations, the ESS may organize the data stored therein such that data that is accessed more frequently by the servers (e.g., data blocks not stored within the local storages) is stored in such a manner that it can be accessed efficiently (e.g., for sequential read access). In some instances, the ESS may provide a backup copy of portions of the database that are stored locally at the servers.

The local storages corresponding to individual ones of the servers store part of the database contained within the ESS. The storage system architecture and/or configuration of the individual local storages is not specified by the overall system. For example, separate local storages may be provided by different types of storage devices and/or such storage devices may have different configurations. In some implementations, a given local storage may be partitioned to provide storage for other applications as well as the system described herein.

The servers may form a network of server computer nodes, where one or more leader nodes communicate with the client to acquire queries and deliver data for further processing, such as display, and manages the processing of queries by a plurality of compute node servers. Individual servers process queries in parallel fashion by reading data simultaneously from local storage and the ESS to enhance I/O performance and throughput. The proportions of the data read from local storage and the ESS, respectively, may be a function of (i) data throughput between a given server and the corresponding local storage, and (ii) data throughput between the ESS and the given server. In some implementations, the proportions of the data read out from the separate sources may be determined according to a goal of completing the data read out from the local storage and the data read out from the ESS at approximately the same time. Similarly, the given server may adjust, in an ongoing manner, the portion of the database that is stored in the corresponding local storage in accordance with the relative data throughputs between the server and the local storage and between the server and the ESS (e.g., where the throughput between the server and the local storage is relatively high compared to the throughput between the server and the ESS, the portion of the database stored on the local storage may be adjusted to be relatively large). In some implementations, the individual servers may include one or more of a database engine, a distributed data manager, a I/O system, and/or other components.

The clients may operatively connect to the servers, and may generate database queries that are routed to the servers. Results of the queries (generated by processing on the server) may be sent to the client for disposition and display processing.

According to various embodiments, data may be loaded from an external data source (e.g., via a client) to the database. A method of loading such data to the database may include receiving the data from the external data source, organizing the received data (e.g., into data blocks), writing the received data into the database held in the ESS, and/or writing portions of the received data into the individual local storages by the individual servers.

In some embodiments, queries received from the client may be processed by the servers. A method of receiving and processing such a query may include receiving a query from a client, distributing the query amongst the servers for processing, at individual servers, determining the amount of data that should be read from local storage and the amount that should be read from the ESS, reading the data out of local storage and the ESS, processing the received data, and/or returning results of the processing to the client. Where the processing of the received data involves the materialization of intermediate data, on a given one of the servers such data may be stored in local storage and/or stored in the ESS based on user configurable settings. In some implementations, the user configurable settings may depend on one or more criteria, such as, for example, capacity utilization, throughput balancing, and/or storage balancing.

In some embodiments, data within the database may be updated and/or deleted (e.g., as data is deleted and/or updated in an external data source). A method for reflecting such changes in the data may include receiving the update and/or deletion, updating and/or deleting the corresponding data (e.g., rows, elements, etc.) within the database copy stored in the ESS, updating the database portions stored by the various local storages corresponding to the servers, and/or adjusting the storage of data within the individual local storages to maintain the balance between the individual local storages and the ESS. In some implementations, a vacuum command may be initiated on one or more of the servers that vacuums the corresponding local storages to remove discontinuities within the portions of the database stored within the local storages that are caused by the updating and/or deleting of data from the stored database portions.

In some embodiments, snapshots of the database may be captured from the ESS. A snapshot may include an image of the database that can be used to restore the database to its current state at a future time. A method of capturing a snapshot of the database may include, monitoring a passage of time since the previous snapshot, if the amount of time since the previous snapshot has breached a predetermined threshold, monitoring the database to determine whether a snapshot can be performed, and performing the snapshot. Determining whether a snapshot can be performed may include determining whether any queries are currently being executed on the database and/or determining whether any queries being executed update the persistent data within the database. This may enhance the capture of snapshots with respect to system in which the database must isolated from queries, updated from temporary data storage, and then imaged to capture a snapshot because snapshots can be captured during ongoing operations at convenient intervals (e.g., when no queries that update the data are be performed).

In some implementations, snapshots of the database may be captured by keeping multiple tables of contents of the blocklist of the database. The table of contents may include the storage address of the data blocks and possibly other block attributes. The table of contents operates in such a manner that when a snapshot is requested, the current table of contents is saved and becomes the snapshot table of contents. A new table of contents is created that initially contains the same information as the snapshot table of contents, but any changes to the database are make made by creating new blocks which are only referenced by the new table of contents. In this embodiment, any number of tables of contents may be created, one for each snapshot. To achieve consistency of the database snapshot across all servers in a multi-server database system, the snapshot may be performed on all servers with no intervening block data writes during the interval in time from the snapshot of the first server's table of content until the snapshot is complete for the last server's table of contents.

In some implementations, snapshots of the database may be captured by utilizing a number of tables of contents where each table of contents includes the size of each data block in addition to the storage address of the block and possibly other block attributes. In such implementations, a database transaction, such as, for example, SQL commit, is performed by writing an additional table of contents that includes the new block sizes. The older tables of content refer to the database state, pre-commit, because they contain the block sizes as they existed before any writes by the transaction being committed. The newer table of contents may include blocks that have been created by the transaction and may exclude blocks that have been abandoned by the transaction. In this embodiment, a snapshot to the ESS may be performed at any time during database operation except the short interval starting from the first server's creation of the table of contents to the last server's completion of creation of its table of contents.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

Figure 1:
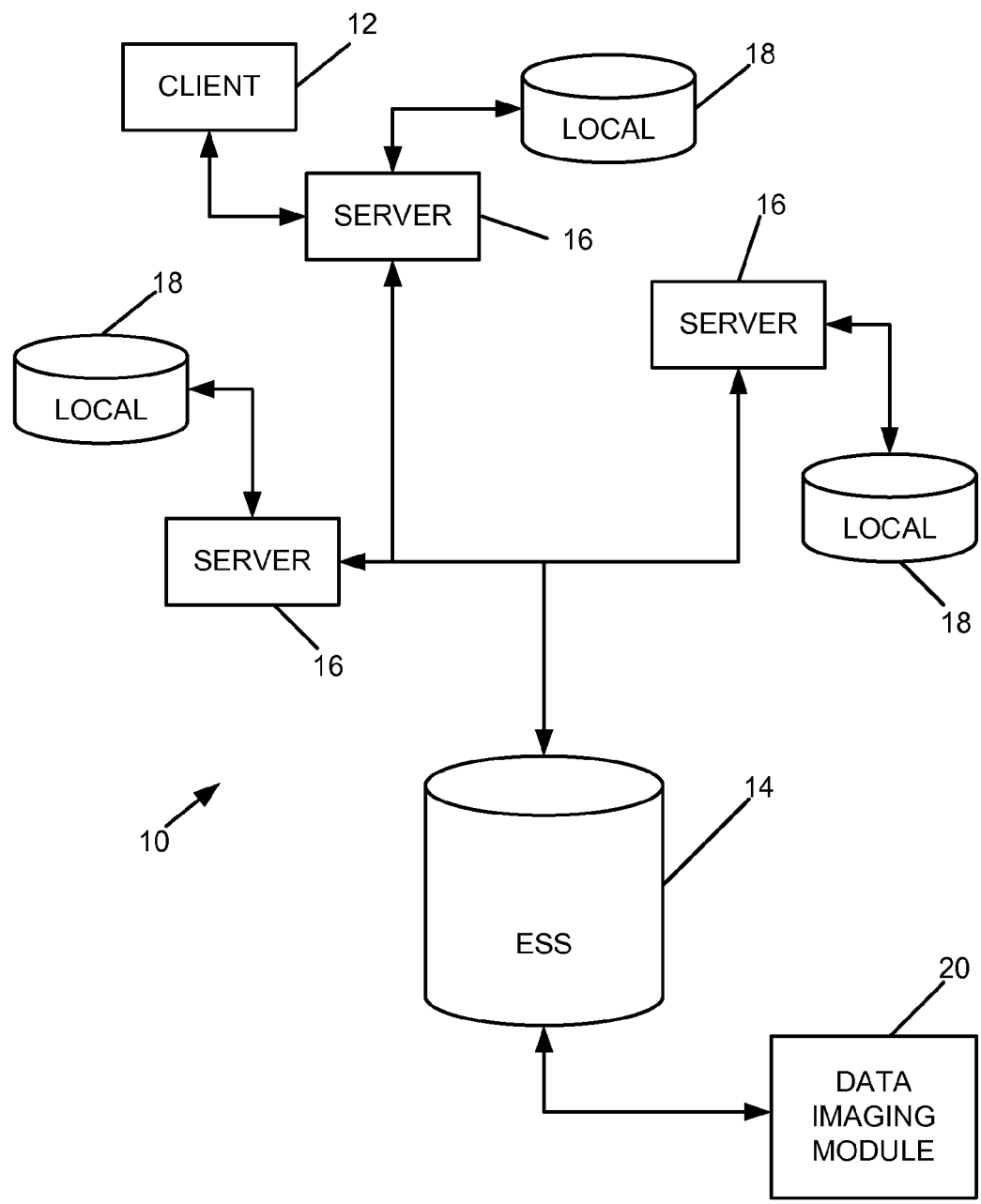
FIG. 1 illustrates a system configured to provide a database, in accordance with one or more embodiments of the invention.

FIG. 1 illustrates a system 10 configured to provide a database, in accordance with one or more implementations of the invention. System 10 may enhance access of the database by increasing overall data throughput of system 10 in processing queries on the database. System 10 may provide enhancements in one or more of security, FR, DR, and/or other aspects of the database at least in part through a mixed storage configuration. As can be seen in FIG. 1, in some implementations, system 10 may include one or more of a client 12, an ESS 14, one or more servers 16, local storage 18 corresponding to individual ones of servers 16, and/or other components.

Clients 12 may be operatively connected to servers 16, and may generate database queries that are routed to servers 16. Results of the queries (generated by processing on the server) may be sent to the querying client 16 for disposition and display processing. In some implementations, client 12 may be provided on a computing platform, such as, for example, a desktop computer, a laptop computer, a handheld computer, a mobile telephone, a personal digital assistant, and/or other computing platforms. Client 12 may provide an interface for users to interact with the database.

ESS 14 may include an external storage system capable of holding a copy of the entire database. For example, in some implementations, ESS 14 may include a SAN. The copy of the database held on ESS 14 may be kept current in real-time, or near real-time. As such, the copy of the database held by ESS 14 may be used as a full reference copy for FR or DR on portions of the database stored within the local storages 18 of individual servers 16. Since the copy of the database held by ESS 14 is kept continuously (or substantially so) current, "snapshots" of the database may be taken by an data imaging module 20 without temporarily isolating ESS 14 from servers 16 in order to ensure that the database will be quiescent. By virtue of the centralized nature of ESS 14, the database copy may be maintained thereon with relatively high security and/or high availability (e.g., due to standard replication and striping policies). In some implementations, ESS 14 may organize the data stored therein such that data accessed more frequently by servers 16 in the manner discussed below (e.g., data blocks not stored within the local storages) may be stored so that it can be accessed more efficiently than data that is requested by servers 16 with less frequency (e.g., for sequential read access). In some instances, the copy of the database held on ESS 14 may not only provide for access by server 16 to data within the database to process queries, but may also provide a backup copy for FR and/or DR on portions of the database stored on local storages 18 locally to servers 16. As such, the commitment of data to the database copy held on ESS 14 may constitute commitment of the data and backup of the data in a single operation.

As has been mentioned above, data imaging module 20 may operate to capture snapshots of the database. A snapshot may include a data image of the database that can be used to restore the database to its current state at a future time. Data imaging module 20 may monitor one or more parameters to determine if a snapshot should be captured. In some instances, the one or more parameters may include one or more of an amount of time, a number of querying operations performed on the database, an amount of information added, deleted, and/or updated within the database, and/or other parameters related to the obsolescence of the previous snapshot. For example, if the parameter is an amount of time, data imaging module may determine if an amount of time that has passed since the previous snapshot has breached a predetermined threshold. This predetermined threshold may be configurable (e.g., by a system administrator).

If the threshold of the parameter (e.g., the amount of time since the previous snapshot, etc.) has been breached, data imaging module 20 may monitor the database to determine whether a snapshot can be performed. Determining whether a snapshot can be performed may include determining whether any queries are currently being executed on the database and/or determining whether any queries being executed update the persistent data within the copy of the database stored in ESS 14. Upon determining that a snapshot can be performed data imaging module 20 may capture a snapshot of ESS 14 without manually isolating ESS 14 from the rest of system 10. This may enhance the capture of snapshots with respect to a system in which the database must be manually isolated from queries, updated from temporary data storage, and then imaged to capture a snapshot because snapshots can be captured by data imaging module 20 during ongoing operations at convenient intervals (e.g., when no queries that update the data are be performed).

In some implementations, snapshots of the database may be captured by keeping multiple tables of contents of the blocklist of the database. The table of contents may include the storage address of the data blocks and possibly other block attributes. The table of contents operates in such a manner that when a snapshot is requested, the current table of contents is saved and becomes the snapshot table of contents. A new table of contents is created that initially contains the same information as the snapshot table of contents, but any changes to the database are make made by creating new blocks which are only referenced by the new table of contents. In such implementations, any number of tables of contents may be created, one for each snapshot. To achieve consistency of the database snapshot across all servers 16 in system 10, the snapshot may be performed on substantially all servers 16 with no intervening block data writes during the interval in time from the snapshot of the first server's table of content until the snapshot is complete for the last server's table of contents.

In some implementations, snapshots of the database may be captured by utilizing a number of tables of contents where each table of contents includes the size of each data block in addition to the storage address of the block and possibly other block attributes. In such implementations, a database transaction, such as an SQL commit, is performed by writing an additional table of contents that includes the new block sizes. The older tables of content refer to the database state, pre-commit, because they contain the block sizes as they existed before any writes by the transaction being committed. The newer table of contents may include blocks that have been created by the transaction and may exclude blocks that have been abandoned by the transaction. In this embodiment, a snapshot to the ESS may be performed at any time during database operation except the short interval starting from the first server's creation of the table of contents to the last server's completion of creation of its table of contents.

Servers 16 may provide a network of processing nodes, where one or more of servers 16 may function as leader nodes that communicate with client 12 to acquire queries and/or deliver data for further processing on client 12. A leader node may further manage one or more of the other servers 16 acting as computing nodes to process a queries acquired by the leader node.

Local storages 18 corresponding to individual ones of servers 16 store part of the database copy contained within ESS 14. The architecture and/or configuration of the individual local storages 18 is not specified by system 10. For example, separate local storages 18 may be provided by different types of storage devices and/or such storage devices may have different configurations. In some implementations, a given local storage 18 may be partitioned to provide storage for other applications as well as the system described herein. For example, a given local storage 18 may use RAID5 for local performance and disk failover, may use RAID1 for local redundancy, etc.

The architecture and/or functionality of system 10 may enable each of servers 16 and the corresponding local storage 18 to function as an autonomous (or semi-autonomous) unit. For example, various aspects of the storage of a portion of the database on local storage 18 may be accomplished by server 16 without the need of organization/management from some centralized manager (e.g., provided at or with ESS 14).

Figure 2:
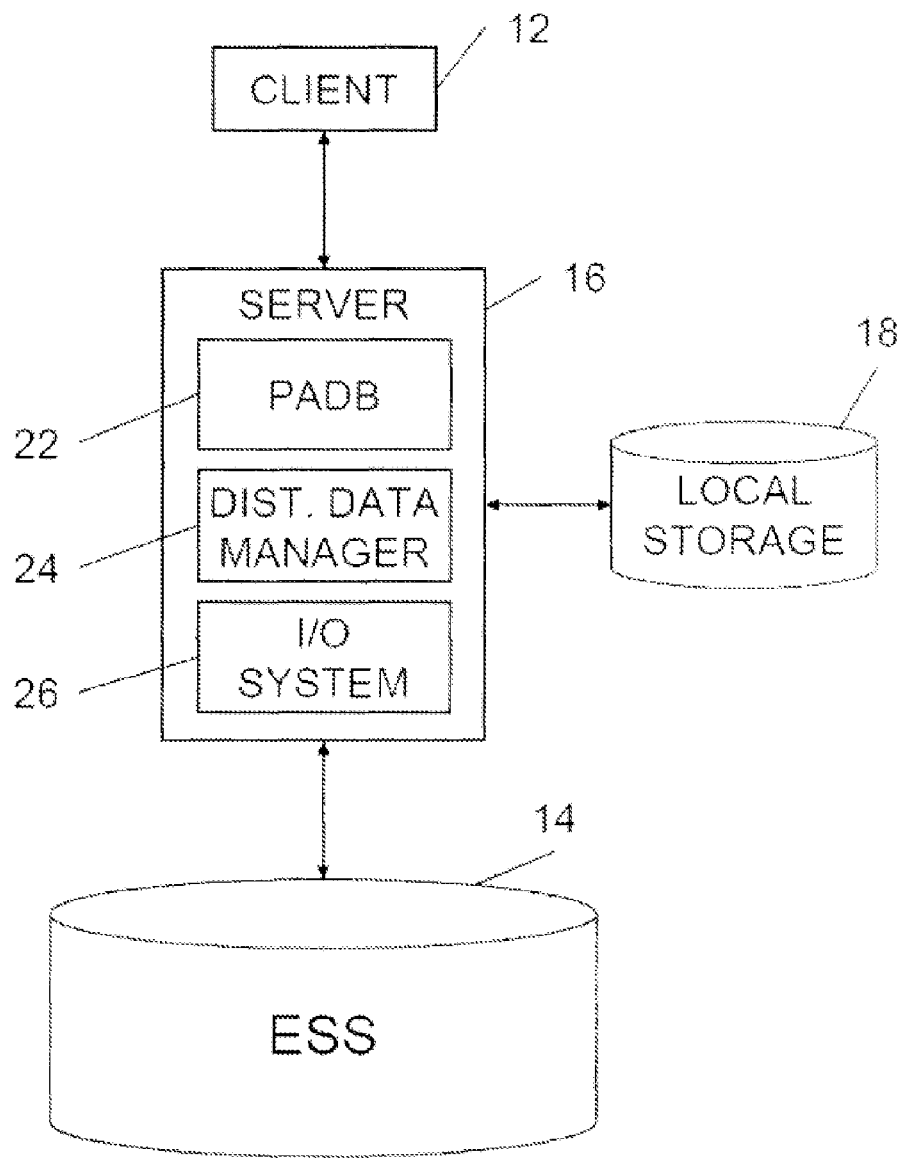
FIG. 2 illustrates a server, according to one or more embodiments of the invention.

FIG. 2 illustrates, with more detail than is shown in FIG. 1, a configuration of server 16 and local storage 18 within system 10, in accordance with one or more embodiments of the invention. As can be seen in FIG. 2, server 16 may include one or more of a database engine 22, a distributed data manager 24, an I/O system 26, and/or other components. One or more of the components may be provided by modules being executed on one or more processors. A processor may include one or more of a central processing unit, a digital circuit, an analog circuit, a state machine, a field-programmable gate array, and/or other processors. One or more of database engine 22, distributed data manager 24, and/or I/O system 26 may be implemented in hardware, software, firmware, and/or some combination of hardware, software, and/or firmware.

In some implementations, database engine 22 may include an application capable of managing communication with client 12 (e.g., receiving queries, outputting results, etc.), receiving data from data sources to be written to the database, receiving deletions and/or updates to the data contained within the database, managing queries received from client 12, obtaining data from the database to process the data in accordance with queries from client 12, processing data from the database in accordance with queries received from client 12, and/or other tasks with respect to the database.

According to various implementations, distributed data manager 24 may manage transactions between database engine 22 and the database such that the parallel storage of the database between local storage 18 and ESS 14 may be transparent to database engine 22. In other words, the logical view of the representation of data within the database from the point of view of database engine 22 (e.g., LUN, block format, block layout, file system/raw device, etc.) may be the same for data stored on both local storage 18 and ESS 14. As such, physical knowledge of where data is actually stored (within local storage 18 and/or ESS 14) may be maintained by distributed data manager 24. Further, transactions between database engine 22 and the database through I/O system 26 may be routed through distributed data manager 24 to ensure that data is received from and/or written to the appropriate storage locations.

If database engine 22 generates a request to receive data from the database, distributed data manager 24 may map the request to portions of the requested data stored in each of local storage 18 and ESS 14 so that separate portions of the data are read out from local storage 18 and ESS 14 in parallel fashion, thereby enhancing I/O performance and throughput. The proportions of the data portions read from local storage and ESS 14, respectively, may be a function of (i) data throughput between server 16 and local storage 18, and (ii) data throughput between ESS 14 and server 16. In some implementations, the proportions of the data portions read out from the separate sources may be determined according to a goal of completing the data read out from local storage 18 and the data read out from ESS 14 at approximately the same time. For example, in a configuration where overall data throughput between local storage 18 and server 16 is 800 MB/s, and throughput between ESS 14 and server 16 is 400 MB/s, distributed data manager 24 may map a request for data from the database to a request from local storage for ⅔ of the requested data and a separate request from ESS 14 for the remaining ⅓ of the requested data.

Where processing a request causes database engine 22 to generate intermediate data, distributed data manager 24 may manage the storage of the intermediate data to one or both of ESS 14 and/or local storage 18. The determination as to whether the intermediate data should be written to ESS 14, local storage 18, or some combination of ESS 14 and local storage 18 (and the proportions that should go to each of ESS 14 and local storage 18) may be based on capacity, utilization, throughput, and/or other parameters of ESS 14 and/or local storage 18.

In some implementations, distributed data manager 24 may control the portion of the database that is written to local storage 18. The proportion of the database included in this portion may be a function of one or more of available storage space in local storage 18 (e.g., larger available storage may receive a larger proportion of the database), data throughput between local storage 18 and server 16 (e.g., the faster data can be read out from local storage 18 to server 16, the larger the proportion saved to local storage 18 may be), ESS 14 utilization (e.g., the heavier utilization of ESS 14, the larger the proportion saved to local storage 18 may be), and/or other parameters that impact the storage of information to local storage 18 and/or the communication of information between server 16 and local storage 18. For example, if throughput between local storage 18 and server 16 is twice as fast as throughput between ESS 14 and server 16 (as was the case in the exemplary configuration described above), distributed data manager 24 may cause ⅔ of the database to be stored in local storage 18. Of course, this distribution may further be impacted by one or more other parameters (e.g., those enumerated in this paragraph).

Distributed data manager 24 may control which data within the database will be included in the portion of the database stored to local storage 18. The determination as to which data should be stored to local storage may be based on parameters related to the data such as, for example, whether data is persistent, temporary, intermediate, and/or other parameters. The determination may be related to one or more system parameters, such as, for example, capacity, utilization, throughput, and/or other parameters of ESS 14 and/or local storage 18.

Distributed data manager 24 may control the manner in which data from the database is physically stored on local storage 18. For example, distributed data manager 24 may ensure that data is stored on the outer tracks of disks forming local storage 18 (e.g., to facilitate read-out). In some instances, distributed data manager may ensure that the data from the database is balanced between the disks forming local storage 18 to alleviate "hot spots" and/or other adverse impacts of unbalanced storage.

In certain implementations, distributed data manager 24 may perform periodic audits of one or more system parameters that may impact the amount of data that should be included within the portion of the database stored to local storage 18. These system parameters may include one or more of data throughput between server 16 and local storage 18, data throughput between server 16 and ESS 14, ESS 14 utilization, local storage 18 utilization, storage location on local storage 18, and/or other system parameters. Upon performing such an audit, distributed data manager 24 may migrate data between local storage 18 and ESS 14 and/or may relocate the physical storage of data on local storage 18 in order to compensate for changes in the system parameters audited (e.g., where the throughput between 16 server and local storage 18 decreases, the portion of the database stored within local storage is decreased).

When data is entered to system 10 (e.g., through an external data source, through client 12, etc.), distributed data manager 24 may write the data to the database, ensuring that it is stored appropriately at ESS 14 and/or local storage 18. Upon receiving data, distributed data manager 24 may organize the data into blocks. A block of data may form the smallest unit of physical storage allocated to local storage 18. By way of non-limiting example, a block of data may comprise columnar values of the database, row values of the database, and/or other blocks of data from the database. Blocks of data may hold data from the database in raw or compressed form. The blocks may then be directed by distributed data manager 24, through I/O system 26, to ESS 14 to be written to the database. Distributed data manager 24 may determine whether some or all of the new blocks should be included within the portion of the database stored on local storage 18 to maintain the appropriate proportion of the database on local storage 18, and may direct the appropriate blocks, through I/O system 26, to local storage 18.

Similarly, if data is deleted from and/or updated in system 10, (e.g., through an external data source, through client 12, etc.), distributed data manager 24 may map the deletions and/or updated data to the appropriate locations on ESS 14 and/or local storage 18. Further, distributed data manager 24 may determine whether the changes to the data caused by the deletions and/or updates have given rise to a need for the portion of the database stored within local storage 18 to be adjusted to maintain the appropriate proportion between the portion of the database stored on local storage 18 and the database as a whole.

As should be appreciated from the foregoing, each server 16 of system 10 includes its own distributed data manager 24 capable of managing the storage of data on local storage 18, accessing data from the database, handling deletions and/or updates to the database, and/or performing other tasks related to the database in an autonomous (or semi-autonomous) manner. Further, although the processing of the database in accordance with a query from client 12 may be performed in cooperation by a plurality of servers 16, each server 16 may manage its own distinct subset of the requisite processing in an autonomous (or semi-autonomous) manner. This may present an advantage over conventional systems utilizing centralized storage of the database, such as a SAN, in that the operation of individual servers 16 does not rely on a centralized management processor to facilitate database operations on the server level.

Figure 3:
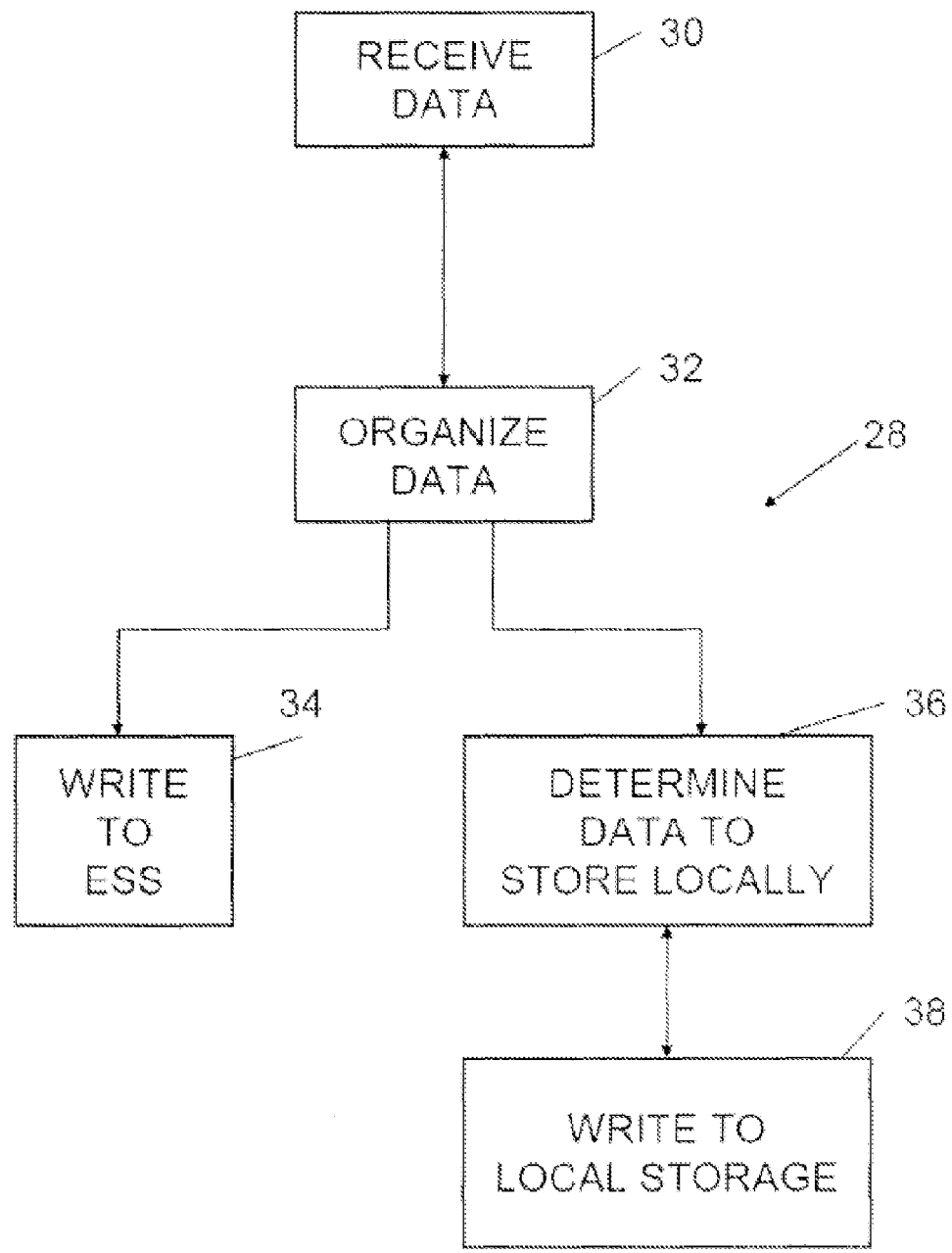
FIG. 3 illustrates a method of loading data (e.g., from an external data source) to the database, in accordance with one or more embodiments of the invention.

FIG. 3 illustrates a method 28 of loading data (e.g., from an external data source) to the database. Although the operations of method 28 are discussed below with respect to the components of system 10 described above and illustrated in FIGS. 1 and 2, it should be appreciated that this is for illustrative purposes only, and that method 28 may be implemented with alternative components and/or systems without departing from the scope of this disclosure. Further, the operations of method 28 presented below are intended to be illustrative. In some embodiments, method 28 may be accomplished with one or more additional operations not described, and/or without one or more of the operations discussed. Additionally, the order in which the operations of method 28 are illustrated in FIG. 3 and described below is not intended to be limiting.

Method 28 includes an operation 30, at which data may be received from an external data source. In some embodiments, operation 30 may be performed by a database engine of a database server similar to, or the same as, database engine 22 of server 16, illustrated in FIG. 2 and described above.

At an operation 32, the data received at operation 30 may be organized into blocks for storage in the database. In some embodiments, operation 30 may be performed by a distributed data manager of a database server similar to distributed data manager 24, illustrated in FIG. 2 and described above.

At an operation 34, the data blocks formed at operation 32 may be written to an ESS (e.g., such as ESS 14, shown in FIGS. 1 and 2 and described above). In some embodiments, operation 32 may be performed by the distributed data manager.

At an operation 36, a determination is made as to whether any of the newly added data should be stored locally to the database server. This determination may be made to maintain a portion of the database on storage local to the server (e.g., local storage 18, illustrated in FIGS. 1 and 2, and described above) with a predetermined proportion to the database as a whole. The distributed data manager of the database server may make this determination based on one or more of the parameters discussed above with respect to distributed data manager 24 (illustrated in FIG. 2).

At an operation 38, the portion of the newly added data, if any, is written to storage that is local to the server. Operation 38 may be performed by the distributed data manager.

Figure 4:
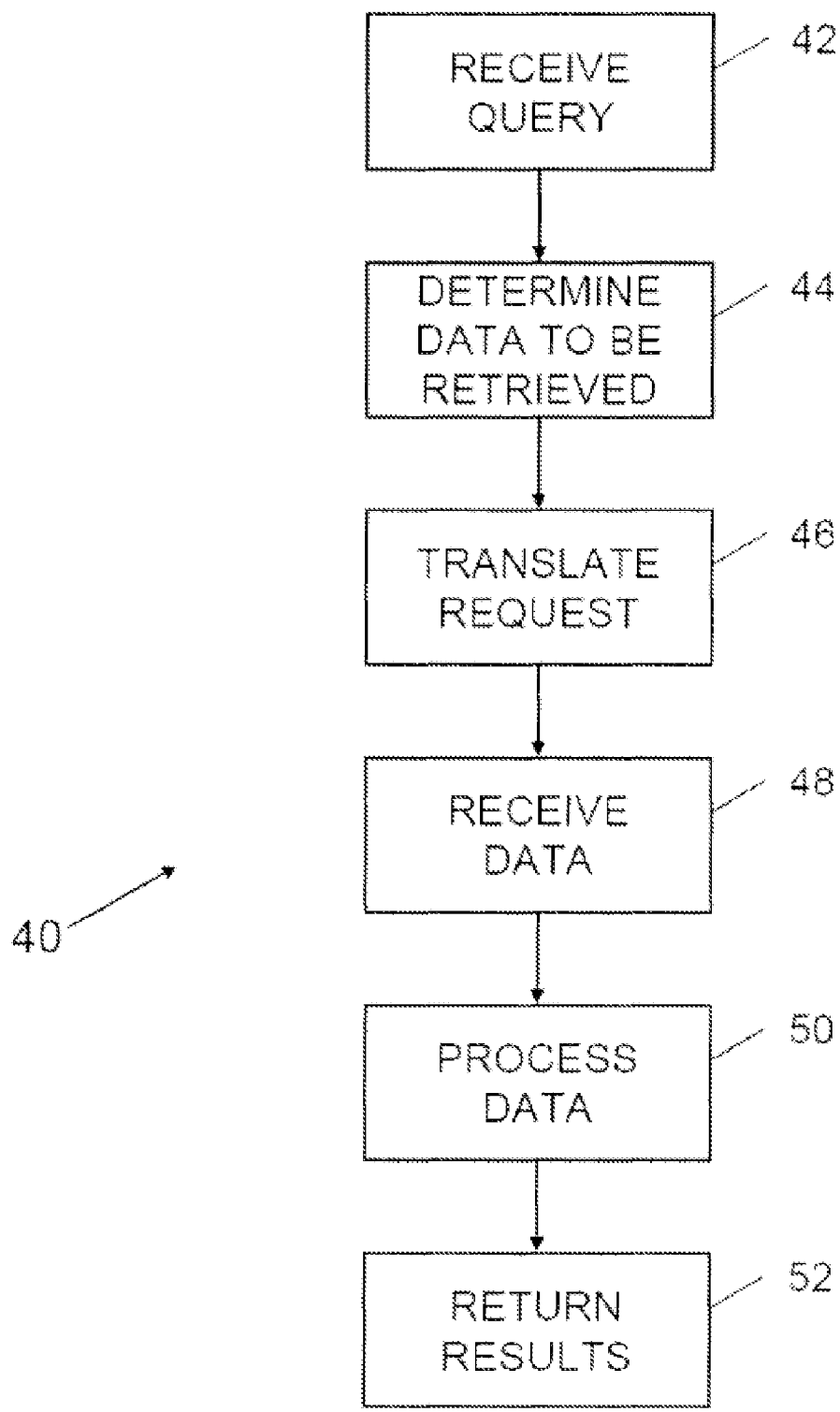
FIG. 4 illustrates a method 40 of receiving and processing a query on a database, according to one or more embodiments of the invention.

FIG. 4 illustrates a method 40 of receiving and processing a query on a database. Although the operations of method 40 are discussed below with respect to the components of system 10 described above and illustrated in FIGS. 1 and 2, it should be appreciated that this is for illustrative purposes only, and that method 40 may be implemented with alternative components and/or systems without departing from the scope of this disclosure. Further, the operations of method 40 presented below are intended to be illustrative. In some embodiments, method 40 may be accomplished with one or more additional operations not described, and/or without one or more of the operations discussed. Additionally, the order in which the operations of method 40 are illustrated in FIG. 4 and described below is not intended to be limiting.

At an operation 42, a query may be received. The query may be received from a database client, such as client 12, shown in FIGS. 1 and 2 and described above. In some embodiments, operation 42 may be performed by a database engine of a database server that is similar to, or the same as, database engine 22 of server 16, illustrated in FIGS. 1 and 2 and described above.

At an operation 44, a determination may be made as to which data in the database should be retrieved in order to process the query received at operation 42, and a request for this data may be generated. In some embodiments of the invention, operation 44 may be performed by the database engine.

At an operation 46, the request generated at operation 44 may be translated to retrieve separate portions of the requested data in parallel from an ESS (e.g., ESS 14 shown in FIGS. 1 and 2 and described above) and storage that is local to the server (e.g., local storage 18 shown in FIGS. 1 and 2 and described above). The portions of the requested data may be determined based on the relative throughputs of the ESS and the local storage to the server with the intention that both of the retrievals will take the approximately the same amount of time. In some embodiments, operation 46 may be performed by a distributed data manager of the server that is the same as or similar to distributed data manager 24 shown in FIG. 2 and described above.

At an operation 48, the separate data portions determined at operation 46 may be received by the database server, and at an operation 50, the received data may be processed in accordance with the query received at operation 42. In some instances, the processing of the received data involves the materialization of intermediate data. Such intermediate data may be stored in local storage and/or stored in the ESS based on user configurable settings. In some implementations, the user configurable settings may depend on one or more criteria, such as, for example, capacity utilization, throughput balancing, and/or storage balancing. In some embodiments, the processing of data at operation 50 may be performed by the database engine, while the storage and/or retrieval of intermediate data may be managed by the distributed data manager.

At an operation 52, the results of the processing performed at operation 52 may be returned to the querying client. In some embodiments, operation 52 may be performed by the database engine.

Figure 5:
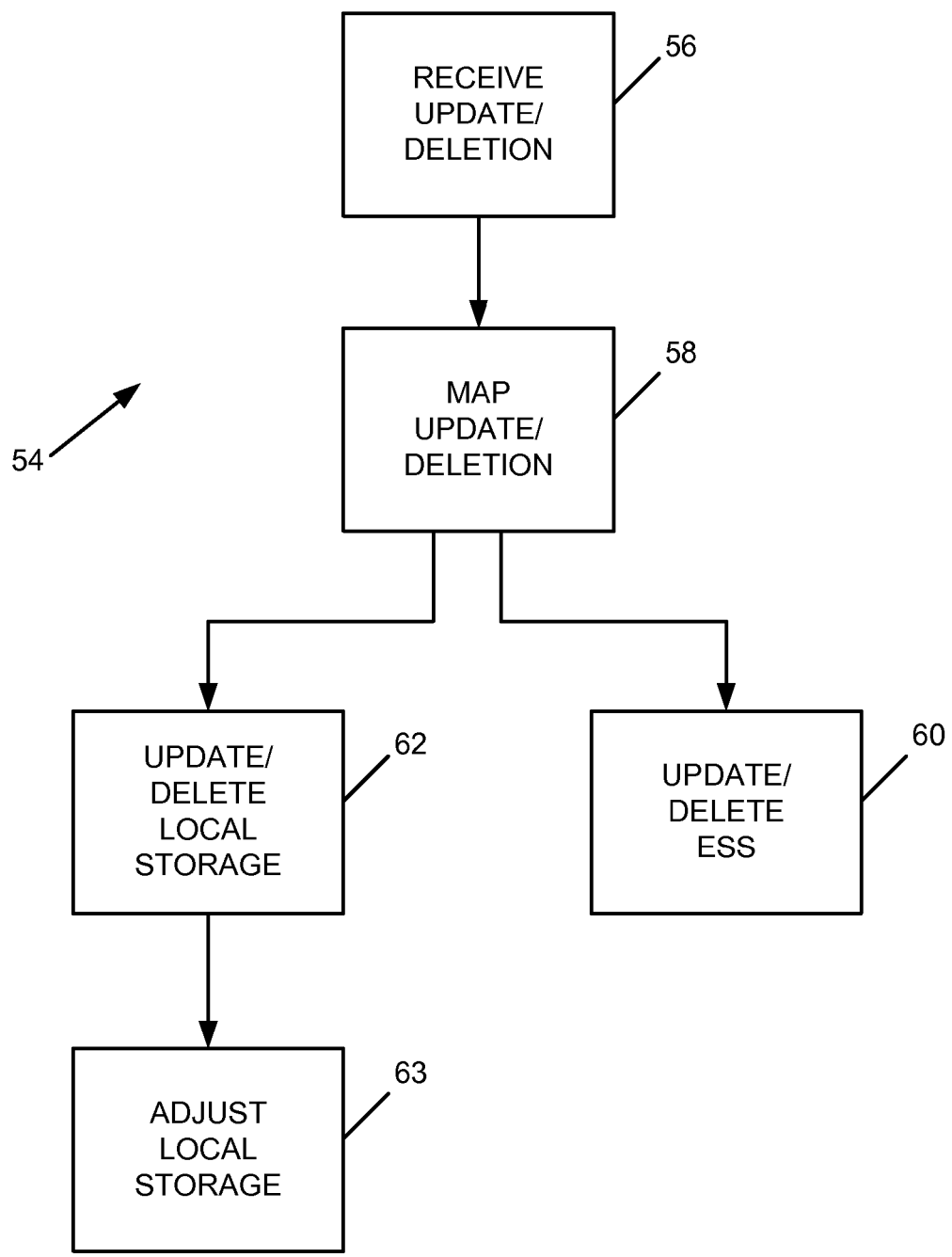
FIG. 5 illustrates a method 54 of deleting and/or updating data within the database, in accordance with one or more embodiments of the invention.

FIG. 5 illustrates a method 54 of deleting and/or updating data within the database. Although the operations of method 54 are discussed below with respect to the components of system 10 described above and illustrated in FIGS. 1 and 2, it should be appreciated that this is for illustrative purposes only, and that method 54 may be implemented with alternative components and/or systems without departing from the scope of this disclosure. Further, the operations of method 54 presented below are intended to be illustrative. In some embodiments, method 54 may be accomplished with one or more additional operations not described, and/or without one or more of the operations discussed. Additionally, the order in which the operations of method 54 are illustrated in FIG. 5 and described below is not intended to be limiting.

At an operation 56, an update and/or deletion to data within the database may be received and a command to update and/or delete the appropriate data may be generated. In some embodiments, operation 56 may be performed by a database engine of a database server that is the same as, or similar to, database engine 22 shown in FIG. 2 and described above.

At an operation 58, the update and/or deletion to data within the database is mapped to the appropriate data stored within an ESS (e.g., ESS 14 shown in FIGS. 1 and 2 and described above) that holds the database. In some instances, the data may further be held within a portion of the database stored locally by the database server (e.g., within local storage 18 shown in FIGS. 1 and 2 and described above). In these instances, the update and/or deletion may be mapped to the appropriate data within the local storage. In some embodiments, operation 58 may be performed by a distributed data manager of the server that is the same as or similar to distributed data manager 24 shown in FIG. 2 and described above.

At an operation 60, the appropriate data stored on the ESS is updated and/or deleted, and at an operation 62, the appropriate data stored on the local server is updated and/or deleted. At an operation 63, the proportion of the portion of the database stored on the local storage to the database as a whole is adjusted to account for the update and/or deletion of data performed at operations 60 and 62. In some embodiments, operation 63 may be performed by the distributed data manager to maintain the appropriate balance between the portion of the database stored on the local storage and the database as a whole in the manner described above with respect to distributed data manager 24.

Figure 6:
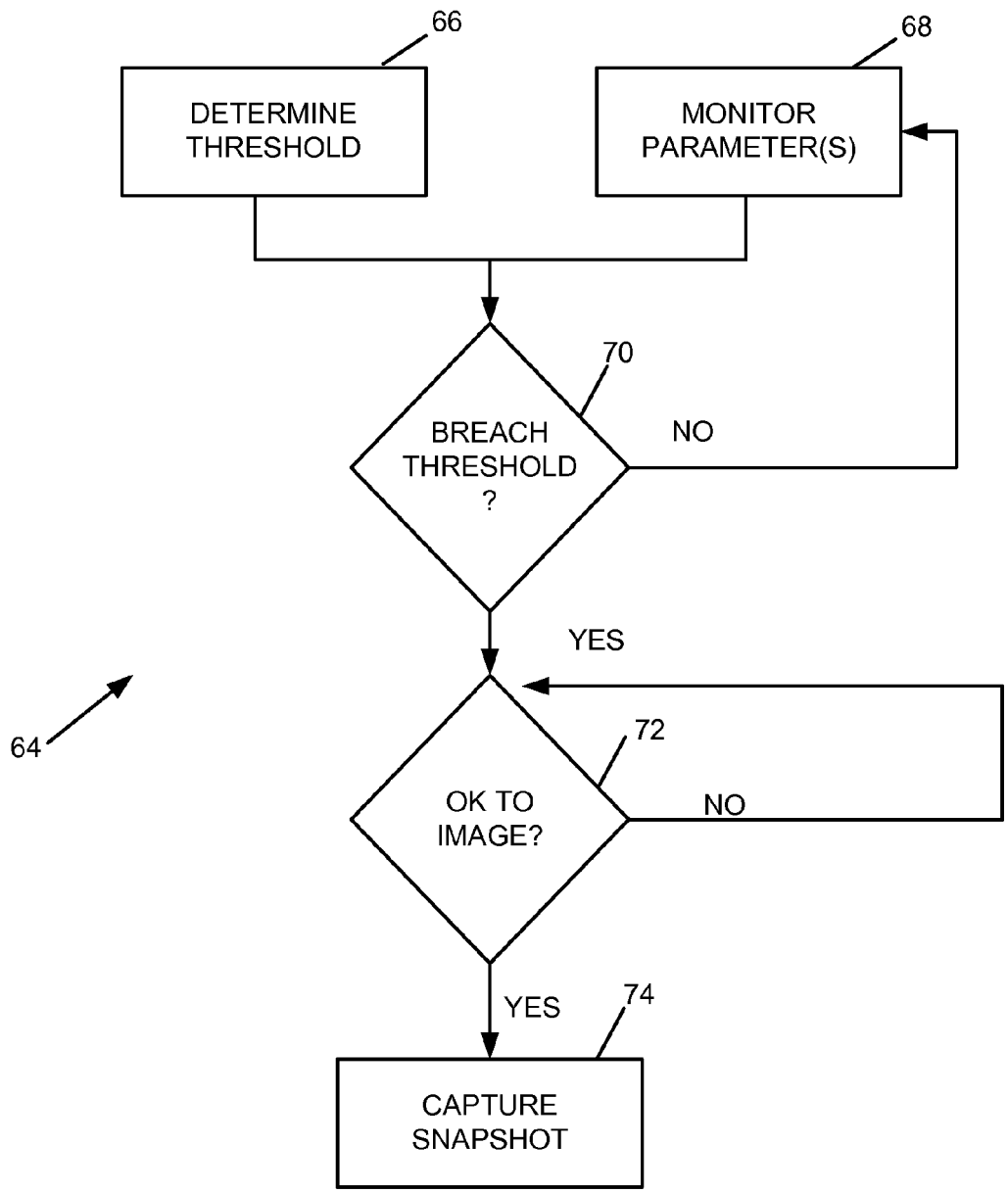
FIG. 6 illustrates a method 64 capturing a snapshot of a database, according to one or more embodiments of the invention.

FIG. 6 illustrates a method 64 capturing a snapshot of a database without manually isolating the database from queries to update the database and/or create an artificially quiescent database. Although the operations of method 64 are discussed below with respect to the components of system 10 described above and illustrated in FIGS. 1 and 2, it should be appreciated that this is for illustrative purposes only, and that method 64 may be implemented with alternative components and/or systems without departing from the scope of this disclosure. Further, the operations of method 64 presented below are intended to be illustrative. In some embodiments, method 64 may be accomplished with one or more additional operations not described, and/or without one or more of the operations discussed. Additionally, the order in which the operations of method 64 are illustrated in FIG. 6 and described below is not intended to be limiting.

At an operation 66, a threshold of one or more parameters related to the obsolescence of a previous snapshot is determined. The threshold may be determined based on one or more of a user configuration, a system parameter, a hard-coded (e.g., permanent) threshold, and/or otherwise determined. In some embodiments, operation 66 may be determined by a data imaging module that is the same as, or similar to, data imaging module 20 shown in FIG. 1 and described above.

At an operation 68, the one or more parameters related to the obsolescence of the previous snapshot are monitored. In some embodiments, operation 68 may be performed by the data imaging module.

At an operation 70, a determination may be made as to whether the one or more monitored parameters have breached the threshold. In some embodiments, operation 70 may be performed by the data imaging module. If the one or more parameters have not breached the threshold, then method 64 may return to operation 68. If the one or more parameters have breached the threshold, then method 64 may proceed to an operation 72.

At operation 72, a determination may be made as to whether a snapshot may be captured. The determination of operation 72 may include, for example, a determination as to whether any queries are currently being processed on the database, a determination as to whether any queries being executed update persistent data in the database, and/or other determination related to whether the database is sufficiently quiescent for a snapshot to be taken. In some embodiments, operation 72 may be performed by the data imaging module.

At an operation 74, a snapshot of the database may be obtained. The snapshot may include an image of the database that can be used to restore the database to its current state at a future time. In some embodiments, operation 74 may be performed by the data imaging module.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A database system comprising a plurality of server nodes, including a given server node, the plurality of server nodes comprising:
  one or more computer processors; and
  a non-transitory computer-readable storage medium storing computer program modules configured to execute on the one or more computer processors, the computer program modules comprising instructions, which, when executed, cause the one or more computer processors to:
    maintain a local copy of a database comprising at least a portion of the database on a local electronic storage that is local to a given server node, the local electronic storage coupled to the computer processor;
    maintain a reference copy of the database, corresponding to a complete copy of the database, stored in an external storage system, the external storage system shared between the plurality of server nodes and storing complete copy of the portions of database stored on two or more of the plurality of server nodes, wherein the complete copy of the database held on the external storage system operates as a backup for the local copy of the database and the complete copy of the database is kept current with respect to the local copy of the database, wherein maintaining the reference copy of the database comprises:
      receiving a request to update data stored in the local storage,
      responsive to receiving the request to update, identifying data stored on the external storage system corresponding to the data being updated in the local electronic storage, and
      performing an update of the data in the local electronic storage and an update of the corresponding data stored on the external storage system as a single operation; and
    responsive to receiving a query:
      map the query to a first portion of result data stored in the local electronic storage of the given server node;
      map the query to the reference copy of the database stored in the shared external storage corresponding to the given server node;
      identify a second portion of result data stored in the external storage system, so that the first portion of the result data and the second portion of the result data are distinct;
      retrieve, in parallel, to the given server node, the first portion of the result data from the local electronic storage of the given server node and the second portion of the result data from the reference copy of the database stored in the external storage system; and
      combine, at the given server node, the first and second portion of the result data to generate a complete result to the query.

2. The database system of claim 1, wherein the computer program modules further comprise instructions that cause the one or more processors to take a snapshot of the reference copy of the database in the external storage system, wherein the snapshot is taken at a time determined using a parameter describing the database.

3. The database system of claim 2, wherein the parameter describing the database comprises a number of querying operations performed on the database since a previous snapshot was taken.

4. The database system of claim 1, wherein the computer program modules further comprise instructions that cause the one or more processors to take a snapshot of the reference copy of the database stored in the external storage system, wherein taking the snapshot comprises storing a table of contents describing blocks of data, the table of contents storing storage address of each block and size of each block.

5. The database system of claim 1, wherein the computer program modules further comprise instructions that cause the one or more processors to:
  maintain tables of contents corresponding to snapshots of database, each table of content representing information describing data blocks of a snapshot.

6. The database system of claim 5, wherein the table of content stores storage address of data blocks of the database.

7. The database system of claim 1, wherein the computer program modules further comprise instructions that cause the one or more processors to:
  maintain a current table of content representing information describing data blocks;
  receive a request for a snapshot; and
  responsive to the request, create the snapshot and store the current table of content in association with the snapshot.

8. The database system of claim 7, wherein the current table of contents is a previous table of contents, wherein the instructions further cause the one or more processors to:
  create a new table of content and initialize the new table of content based on the previous table of contents; and
  modify the new table of content responsive to changes in data blocks of the database.

9. A non-transitory computer readable storage medium including computer executable code adapted to perform steps comprising:
  maintaining a local copy of a database comprising at least a portion of the database on a local electronic storage that is local to a given server node of a plurality of server nodes, the local electronic storage coupled to a given computer processor;
  maintaining a reference copy of the database, corresponding to a complete copy of the database, stored in an external storage system, the external storage system shared between the plurality of server nodes and storing copy of the portions of database stored on two or more of the plurality of server nodes, wherein the complete copy of the database held on the external storage system operates as a backup for the local copy of the database and the complete copy of the database is kept current with respect to the local copy of the database, wherein maintaining the reference copy of the database comprises:
    receiving a request to update data stored in the local electronic storage,
    responsive to receiving the request to update, identifying data stored on the external storage system corresponding to the data being updated in the local electronic storage, and
    performing an update of the data in the local storage and an update of the corresponding data stored on the external storage system as a single operation; and
  responsive to receiving a query:

mapping the query to a first portion of result data stored in the local storage of the given server node;
mapping the query to the reference copy of the database stored in the shared external storage corresponding to the given server node;
identifying a second portion of result data stored in the external storage system, so that the first portion of the result data and the second portion of the result data are distinct;
retrieving, in parallel, by the given server node, the first portion of the result data from the local storage and the second portion of the result data from the reference copy stored in the external storage system; and
combining, at the given server node, the first and second portion of the result data to generate a complete result to the query.

10. The non-transitory computer readable storage medium of claim 9, wherein computer executable code is further adapted to take a snapshot of the reference copy of the database stored in the external storage system, wherein the snapshot is taken at a time determined using a parameter describing the database.

11. The non-transitory computer readable storage medium of claim 10, wherein the parameter describing the database comprises a number of querying operations performed on the database since a previous snapshot was taken.

12. The non-transitory computer readable storage medium of claim 9, wherein computer executable code is further adapted to perform the step of taking a snapshot of the reference copy of the database stored in the external storage system, wherein taking the snapshot comprises storing a table of contents describing blocks of data, the table of contents storing storage address of each block and size of each block.

13. A method for maintaining storage of data at a given server node of a plurality of server nodes in a database system, the method comprising:
maintaining a local copy of a database comprising at least a portion of the database on a local electronic storage that is local to a given server node, the local electronic storage coupled to a given computer processor;
maintaining a reference copy of the database, corresponding to a complete copy of the database, stored in an external storage system, the external storage system shared between the plurality of server nodes and storing copy of the portions of database stored on two or more of the plurality of server nodes, wherein the complete copy of the database held on the external storage system operates as a backup for the local copy of the database and the complete copy of the database is kept current with respect to the local copy of the database, wherein maintaining the reference copy of the database comprises:
receiving a request to update data stored in the local storage,
responsive to receiving the request to update, identifying data stored on the external storage system corresponding to the data being updated in the local storage, and
performing an update of the data in the local storage and an update of the corresponding data stored on the external storage system as a single operation; and
responsive to receiving a query:
mapping the query to a first portion of result data stored in the local storage of the given server node;
mapping the query to the reference copy of the database stored in the shared external storage corresponding to the given server node;
identifying a second portion of result data stored in the external storage system, so that the first portion of the result data and the second portion of the result data are distinct;
retrieving, in parallel, by the given server node, the first portion of the result data from the local storage and the second portion of the result data from the reference copy stored in the external storage system; and
combining, at the given server node, the first and second portion of the result data to generate a complete result to the query.

14. The method of claim 13, further comprising, taking a snapshot of the reference copy of the database stored in the external storage system, wherein the snapshot is taken at a time determined using a parameter describing the database.

15. The method of claim 14, wherein the parameter describing the database comprises a number of querying operations performed on the database since a previous snapshot was taken.

16. The method of claim 14, wherein the parameter describing the database comprises an amount of time passed since a previous snapshot was taken.

17. The method of claim 14, wherein the parameter describing the database comprises an amount of information added, deleted, or updated within the database.

18. The method of claim 13, wherein maintaining the reference copy of the database in the external storage system comprises taking a snapshot of the reference copy of the database, wherein taking the snapshot comprises storing a table of contents describing blocks of data, the table of contents storing storage address of each block and size of each block.

19. The method of claim 18, wherein the snapshot of the reference copy of the database is taken without isolating the external storage system from the server.

20. A non-transitory computer readable storage medium including computer executable code adapted to perform steps comprising:
maintaining at least a portion of a database on a local electronic storage that is local to a given server node of a plurality of server nodes, the local electronic storage coupled to a given computer processor;
maintaining a reference copy of the database, corresponding to a complete copy of the database, stored in an external storage system, the external storage system shared between the plurality of server nodes and storing copy of the portions of database stored on two or more of the plurality of server nodes;
responsive to receiving a query:
mapping the query to a first portion of result data stored in the local electronic storage of the given server node;
mapping the query to the reference copy of the database stored in the shared external storage corresponding to the given server node;
identifying a second portion of result data stored in the external storage system, so that the first portion of the result data and the second portion of the result data are distinct;
retrieving, in parallel, by the given server node, the first portion of the result data from the local storage and the second portion of the result data from the reference copy stored in the external storage system;

combining, at the given server node, the first and second portion of the result data to generate a complete result to the query; and storing a first table of contents comprising information describing blocks of data before a commit operation of a transaction; and storing a second table of contents comprising information describing blocks of data after the commit operation including blocks generated by the transaction and excluding blocks abandoned by the transaction.

21. The non-transitory computer readable storage medium of claim 20, wherein the steps further comprise, taking a snapshot of the reference copy of the database stored in the external storage system, wherein the snapshot is taken at a time determined using a parameter describing the database.

22. The non-transitory computer readable storage medium of claim 21, wherein the parameter describing the database comprises a number of querying operations performed on the database since a previous snapshot was taken.

23. The non-transitory computer readable storage medium of claim 21, wherein the parameter describing the database comprises an amount of information added, deleted, or updated within the database.

24. A method for maintaining storage of data in a database system, the method comprising:

maintaining at least a portion of a database on a local electronic storage that is local to a given server node, the local electronic storage coupled to a given computer processor;

maintaining a reference copy of the database, corresponding to a complete copy of the database, stored in an external storage system, the external storage system shared between a plurality of server nodes and storing copy of the portions of database stored on two or more of the plurality of server nodes;

responsive to receiving a query:

mapping the query to a first portion of result data stored in the local electronic storage of the given server node;

mapping the query to the reference copy of the database stored in the shared external storage corresponding to the given server node;

identifying a second portion of result data stored in the external storage system, so that the first portion of the result data and the second portion of the result data are distinct;

retrieving, in parallel, by the given server node, the first portion of the result data from the local storage and the second portion of the result data from the reference copy stored in the external storage system;

combining, at the given server node, the first and second portion of the result data to generate a complete result to the query; and storing a first table of contents comprising information describing blocks of data before a commit operation of a transaction; and storing a second table of contents comprising information describing blocks of data after the commit operation including blocks generated by the transaction and excluding blocks abandoned by the transaction.

25. The method of claim 24, further comprising, taking a snapshot of the reference copy of the database stored in the external storage system, wherein the snapshot is taken at a time determined using a parameter describing the database.

26. The method of claim 25, wherein the parameter describing the database comprises a number of querying operations performed on the database since a previous snapshot was taken.

27. The method of claim 25, wherein the parameter describing the database comprises an amount of information added, deleted, or updated within the database.

* * * * *